United States Patent [19]

Luna

[11] Patent Number: 5,787,155
[45] Date of Patent: Jul. 28, 1998

[54] PRIORITY LINE SWITCHING SYSTEM

[75] Inventor: Michael E. S. Luna, Bothell, Wash.

[73] Assignee: Physio-Control Corporation, Redmond, Wash.

[21] Appl. No.: 334,787

[22] Filed: Nov. 4, 1994

[51] Int. Cl.$^6$ .................................................. H04M 11/00
[52] U.S. Cl. ................................ 379/93.09; 379/106.02
[58] Field of Search ........................... 379/106, 107, 379/102, 104, 105, 94, 93, 98, 97, 96, 38, 93.09, 93.11, 100.15, 100.16, 106.01, 106.02, 102.01, 102.02, 102.07, 93.26, 93.28, 93.23, 93.01

[56] References Cited

U.S. PATENT DOCUMENTS

| | | | |
|---|---|---|---|
| 4,531,527 | 7/1985 | Reinhold, Jr. et al. | 379/38 |
| 4,991,200 | 2/1991 | Lin | 379/100 |
| 5,036,852 | 8/1991 | Leishman | 379/38 |
| 5,347,646 | 9/1994 | Hirosawa et al. | 379/102 |
| 5,367,555 | 11/1994 | Isoyama | 379/106 |
| 5,422,939 | 6/1995 | Kramer et al. | 379/107 |

FOREIGN PATENT DOCUMENTS

| | | |
|---|---|---|
| WO 91/13407 | 9/1991 | WIPO |
| WO 93/25041 | 12/1993 | WIPO |

*Primary Examiner*—Stella Woo
*Attorney, Agent, or Firm*—Christensen O'Connor Johnson & Kindness PLLC

[57] ABSTRACT

The serial data port of a terminal device is normally connected to a peripheral device for data transfer. A telephone connection with a public switched telephone network (PSTN) is monitored to detect, however, if there is an incoming priority data message. If so, the terminal device is notified of the priority message and is allowed to terminate its current data transfer with the peripheral device. The terminal device is then connected to the PSTN to receive the priority message. At the conclusion of the priority message, the terminal device is reconnected to the peripheral device to complete the interrupted data transfer. In this way, the serial port of the terminal device can be used for data transfer with different peripherals, without jeopardizing or delaying reception of a priority data message.

24 Claims, 6 Drawing Sheets

PRIORITY LINE SWITCHING SYSTEM

FIELD OF THE INVENTION

The invention relates generally to data communication apparatus, and more particularly to a system for automatically switching the connection of a data port between different data sources or destination devices.

BACKGROUND OF THE INVENTION

Many computers and electronic instruments are provided with only a single data port through which data may be serially transmitted. If a user wants to use a modem to transmit or receive data over the telephone lines, the user will therefore have to dedicate the data port to the modem connection. While data are being transmitted over that port, the port cannot be used for any other purpose. If the port is to be used to transmit data to or receive data from another peripheral device, the user must disconnect the modem from the port and then connect the port to the peripheral device. In this context, the peripheral device can be a computer, mass storage device, or other instrumentation.

Connecting and disconnecting devices from the serial port on the back of a computer can become very tedious. The manual disconnection and reconnection of the serial data transfer port is slow, awkward, and unreliable. Additionally, the frequent connection and disconnection of devices to the external data port of a computer has a tendency to put unwanted stress on the port connectors.

Constructing a device that can switch a data port to a number of different peripheral devices for data transfer purposes does not, however, solve the problem of accurately receiving data messages from the peripheral devices. Regardless of the number of devices that a port may be connected to, a terminal device may only receive data from the single device to which it is currently connected. As a result, incoming data messages from other devices may be delayed or lost.

In many contexts, it is important that all incoming data messages are received. For example, it is becoming increasingly common for emergency medical technicians (EMTs) to carry data devices that can transmit a patient's vital signs back to a hospital as the patient is being treated. These transmissions are received at the hospital over the public switched telephone network (PSTN). If the hospital has a dedicated terminal device that is constantly monitoring the telephone line for incoming data messages, the messages will be properly received. If, however, the data port on the dedicated terminal device is currently connected to a peripheral device, the terminal device is not available to receive another incoming data message. This could potentially cause the new message to be irretrievably lost or, at the very least, delayed in reaching the appropriate care provider. Because it is so important to receive data concerning a patient's medical condition as soon as possible, terminal device ports that are to receive data from an ambulance are typically dedicated to receiving data messages through a modem.

SUMMARY OF THE INVENTION

The present invention provides a system for automatically switching the connection of a data port on a terminal device between a peripheral device and a modem that is coupleable to a public switched telephone network (PSTN). The switchover is automatically made when an incoming data message is to be received over a phone line. In normal operation, the data port on the terminal device can be coupled to the peripheral device, allowing data transfer between the terminal device and the peripheral. During this period, the terminal device cannot receive or send messages over the PSTN. While the connection between the terminal device and the peripheral device is being maintained, however, a microprocessor and data pump are constantly monitoring the external telephone line to detect an incoming data transmission from a remote device.

Upon detecting a ring signal indicating that there is an incoming transmission, the microprocessor directs a multiplexer to disconnect the terminal device from the peripheral device. The microprocessor then sends a "break" signal to the terminal device to indicate that a priority data message is about to arrive. Following the break signal, the connection between the terminal device and the peripheral device is remade to allow the terminal device and the peripheral device to halt any current data transmission without jeopardizing the data transfer. On the falling edge of the ring signal, the microprocessor directs the multiplexer to disconnect the terminal device from the peripheral device and connect the terminal device to the PSTN via the data pump. The priority data message may then be received by the terminal device. When the transmission of priority data is complete, the microprocessor automatically disconnects the terminal device from the PSTN and reconnects the terminal device to the peripheral device. The disclosed apparatus therefore ensures that priority data messages are received over the PSTN without delay.

Figure 1:
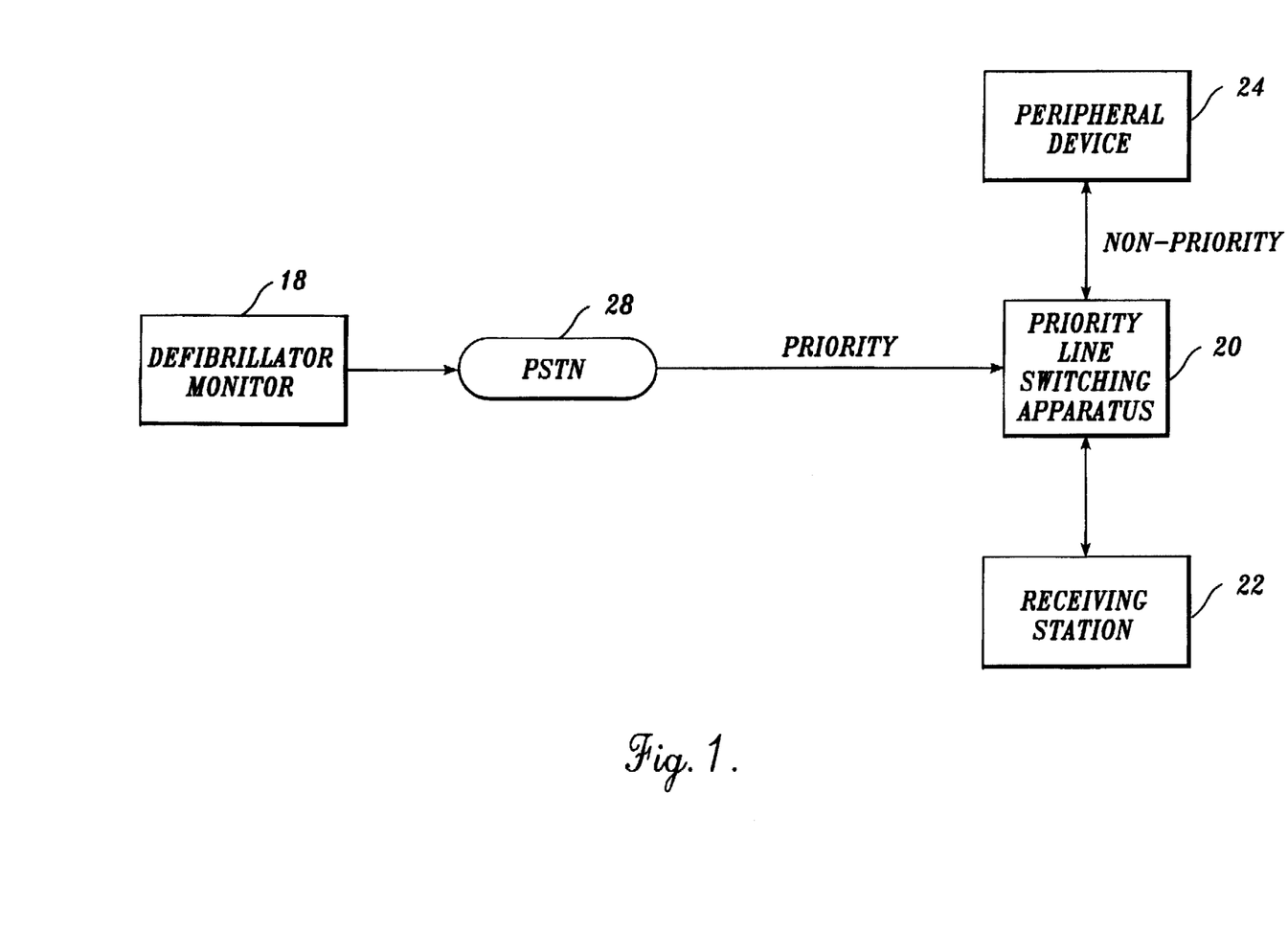
FIG. 1 is a block diagram of a priority line switching system.

As discussed above, the capability of halting data communications to receive an incoming priority data message is especially important in the medical field. In an actual embodiment of the invention, a priority line switching apparatus may be used in a system capable of recording a patient's electrocardiogram at the location of a medical emergency, and transmitting the electrocardiogram to a hospital for review. A block diagram of such a system is shown in FIG. 1, and includes a portable defibrillator/monitor 18, a priority line switching apparatus 20, a receiving station 22, and a peripheral device 24. The portable defibrillator/monitor is capable of recording a patient's electrocardiogram (ECG) and transmitting the ECG over land telephone lines to a hospital from an emergency site. The receiving station is typically located at a hospital for the reception of electrocardiogram transmissions from the portable defibrillator/monitors. The receiving station allows the received ECGs to be temporarily stored and displayed by medical personnel. The receiving station is connected to a peripheral device, such as a device manufactured by Mortara Instrument, Inc. under the trademark EScribe. An EScribe is a PC-based computer system that is capable of managing multiple patient electrocardiograms downloaded from the receiving station. In this particular application, the receiving station is connected by the priority line switching apparatus to the EScribe and to the PSTN. This allows the receiving station to transmit and receive data from the EScribe, while also watching for priority data messages from portable defibrillator/monitors over the PSTN.

When used in the hospital setting, it is obviously critical that the receiving station be capable of receiving patient electrocardiograms over the PSTN at any time. It is therefore an advantage of the apparatus that the apparatus monitors a phone line for incoming messages even though the receiving station may be transmitting data to the peripheral device. When an incoming priority message is received over the modem, the connection between the receiving station and the peripheral device is broken. This ensures that the priority message is received, regardless of the operation of the receiving station when the message arrives.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 2:
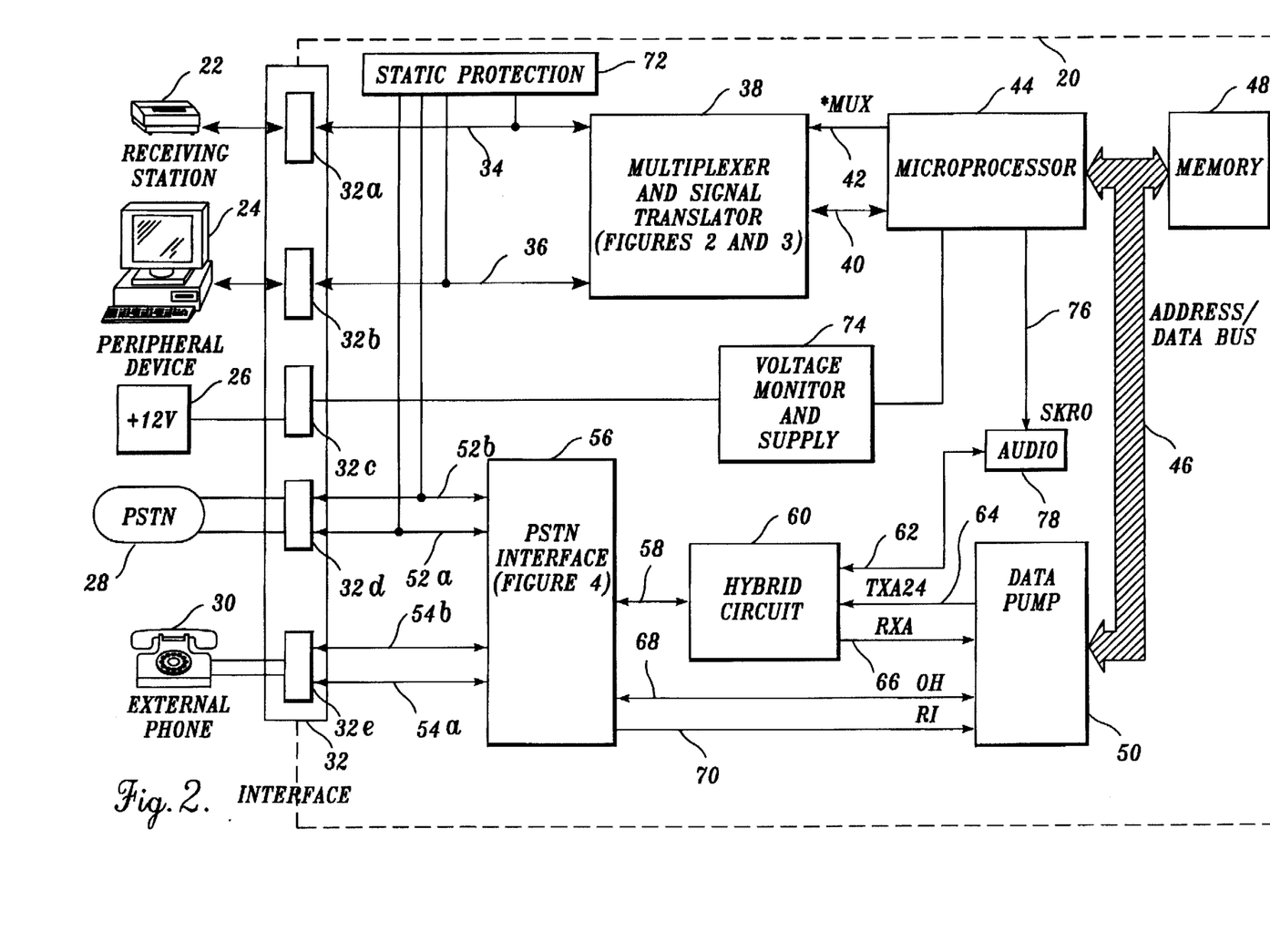
FIG. 2 is a block diagram of a priority line switching apparatus as used in a hospital environment.

One application for the priority line switching apparatus in accordance with the present invention is connecting a receiving station to a peripheral device and to a public switched telephone network (PSTN). FIG. 2 is a block diagram of priority line switching apparatus 20 as it is connected to the other devices when used in this environment. As shown in FIG. 2, priority line switching apparatus 20 contains an interface 32 that allows the apparatus to be connected with a number of external devices through a series of ports 32a, 32b, 32c, 32d, and 32e. In a preferred embodiment, port 32a is used to connect the apparatus with receiving station 22. The receiving station is used to receive, store, and display electrocardiogram records from patients being treated by remote defibrillator/monitor/pacers. Port 32b is connected to peripheral device 24, such as a mass storage device or an EScribe System. Port 32c is connected to a power supply 26 to provide the operating voltage necessary to run the priority line switching apparatus. Port 32d is used to connect priority line switching apparatus 20 with a public switched telephone network 28. Finally, port 32e allows connection of an external phone 30. Ports 32d and 32e are standard telephone jacks, allowing connection to a two-wire telephone line. It will be appreciated that the number of ports in interface 32 can be expanded or reduced to provide additional or fewer connections to the apparatus.

The purpose of priority line switching apparatus 20 is to allow receiving station 22 to be switchably connected to port 32b, yet continue to be ready to receive priority data messages port 32d. In a preferred embodiment of the invention, switching apparatus 20 normally allows receiving station 22 to exchange data with peripheral device 24. While this data transfer is taking place, the priority line switching apparatus monitors the connection with public switched telephone network 28 for any incoming priority data messages through. These priority data messages originate from portable defibrillators/monitors/pacers used in the field by emergency medical technicians (EMTs). After an EMT records a patient's electrocardiogram, the electrocardiogram and additional information may be transmitted to the receiving station over public switched telephone network 28. For purposes of this description, a patient's electrocardiogram and associated information will be referred to as a priority data message. It will be appreciated, however, that other types of data messages requiring priority handling could be received by the priority line switching apparatus.

When priority line switching apparatus 20 receives the incoming priority data message from PSTN 28, it breaks the connection between receiving station 22 and peripheral device 24. As will be discussed in further detail below, switching apparatus 20 then connects receiving station 22 with PSTN 28 to allow the receiving station to receive the priority message. After the priority message has been received, receiving station 22 is reconnected with peripheral device 24. Priority line switching apparatus 20 therefore ensures the prompt reception of priority messages received over PSTN 28.

Examining in more detail the construction of priority line switching apparatus 20, the apparatus can generally be divided into two data transmission paths. The first data transmission path connects receiving station 22 with peripheral device 24. With reference to FIG. 2, receiving station 22 is connected to a multiplexer and signal translator 38 by a serial data bus 34. Multiplexer and signal translator 38 allows serial data bus 34 to be switchably connected to a second serial data bus 36. Serial data bus 36 is connected to port 32b and, consequently, to any peripheral device 24 connected to the port. The multiplexer and signal translator therefore allows data messages to be routed between receiving station 22 and peripheral device 24 over serial data buses 34 and 36. In the preferred embodiment of the invention, serial data buses 34 and 36 are RS-232 compatible.

A microprocessor 44 controls the operation of multiplexer and signal translator 38. Microprocessor 44 asserts a *MUX signal on a line 42 to select which input lines of the multiplexer should be applied to the output lines of the multiplexer. In normal operation, microprocessor 44 provides an appropriate signal on line 42 to ensure that the multiplexer connects the receiving station with the peripheral device. In an actual embodiment of the apparatus, microprocessor 44 is an 80C196, manufactured by Intel and operating at 12 MHz. A memory 48 is connected to microprocessor 44 by an address/data bus 46. Memory 48 can consist of a 32K×8 bit random access memory (RAM) and a 64K×8 bit read only memory (ROM), which are used to store the operating program for priority line switching apparatus 20.

Figure 3:
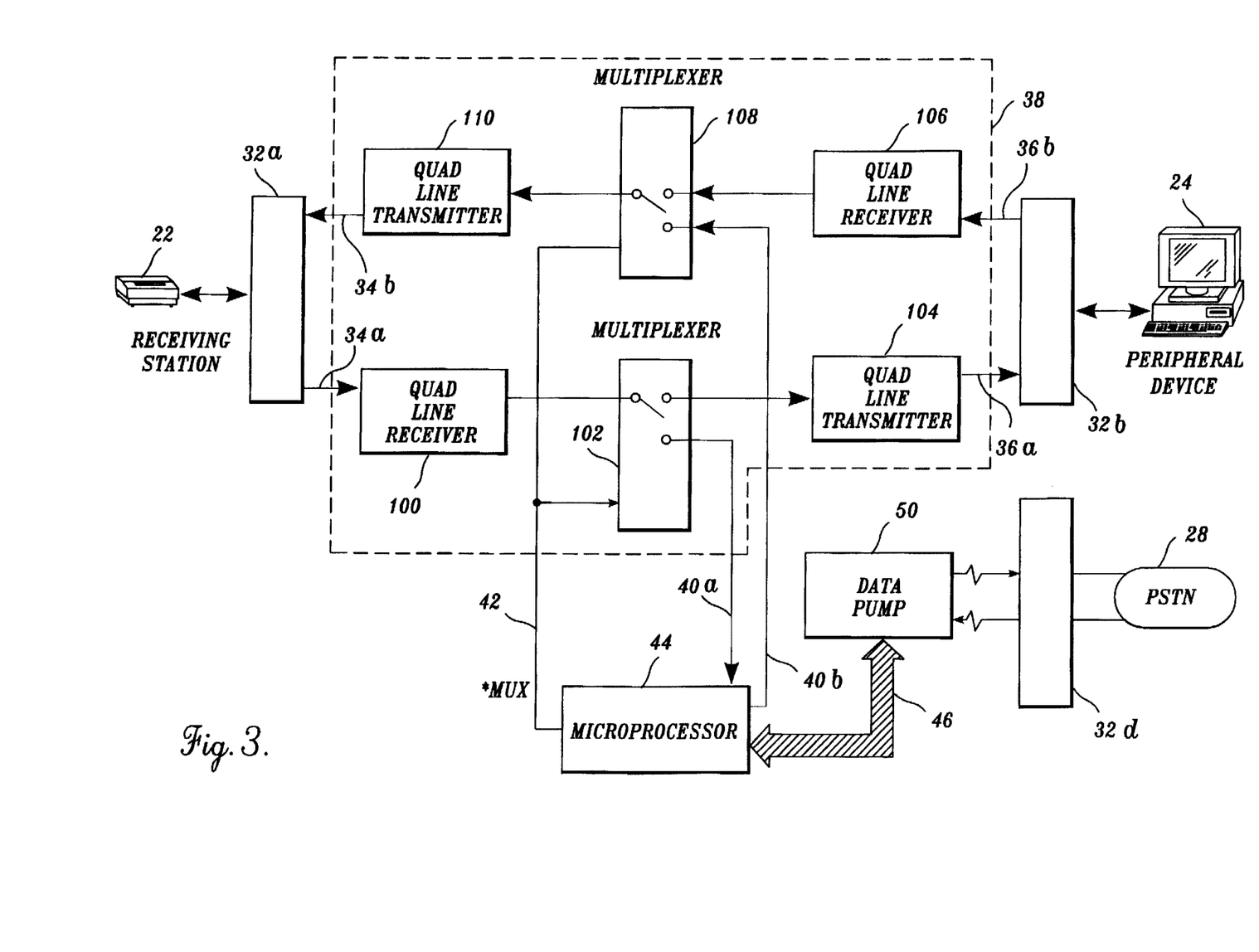
FIG. 3 is a further block diagram of the priority line switching apparatus showing additional details of a multiplexer and signal translator in the apparatus.

The first transmission path between the receiving station and the peripheral device is shown in more detail in the block diagram of FIG. 3. In normal operation, data messages sent from receiving station 22 are initially received by a quad line receiver 100 over serial data bus 34a. The quad line receiver converts the RS-232 compatible signal levels to TTL-compatible signal levels. The data received by quad line receiver 100 is then input to a multiplexer 102. The state of multiplexer 102 is determined by the *MUX signal received from microprocessor 44 on line 42. In normal operation, multiplexer 102 is enabled by the *MUX signal to allow data from quad line receiver 100 to reach a quad line transmitter 104. The quad line transmitter converts the TTL-level signal back to an RS-232 level signal. The data message is then output on serial data bus 36a to peripheral device 24 via port 32b.

When a data message is to be sent from peripheral device 24 back to receiving station 22, the path is generally reversed. Data bus 36b carries the data message to a quad line receiver 106, which converts the signal level to a TTL voltage. The data message is then passed through a multiplexer 108 into a quad line transmitter 110. Again, the signal path through multiplexer 108 is determined by the *MUX signal asserted by microprocessor 44. The quad line transmitter 110 converts the signal to an RS-232 level, and outputs the signal to receiving station 22 over data bus 34b and port 32a. In normal operation, receiving station 22 can therefore communicate with peripheral device 24.

When a priority data message is to be received over public switched telephone network 28, however, multiplexers 102 and 108 are switched to enable the second data transmission path. The second transmission path connects the receiving station with the public switched telephone network. A priority message data received over PSTN 28 is initially converted from analog to digital format by a data pump 50 (data pump in this context is synonymous with the term "modem"). The message is then conveyed to microprocessor 44 over address/data bus 46. Before microprocessor 44 receives the priority data message, it asserts a *MUX signal on line 42 to switch data multiplexers 102 and 108 to conduct messages from the microprocessor rather than from peripheral device 24. Microprocessor 44 then outputs the data message on data bus 40b through multiplexer 108 and quad line transmitter 110. Quad line transmitter 110 converts the message to an RS-232 compatible signal level, and outputs the data to receiving station 22.

Receiving station 22 can similarly transmit data messages to the public switched telephone network 28. A data message from the receiving station is transmitted over serial data bus 34a into quad line receiver 100, which converts the signal levels from RS-232 levels to TTL levels. The data message then passes through multiplexer 102 and into microprocessor 44. Microprocessor 44 converts the serial data to parallel, and conveys the parallel data to data pump 50 for output over public switched telephone network 28.

When data messages are being transmitted between the receiving station and the PSTN, no data communication can take place between the receiving station and the peripheral device. During this period, the peripheral device also cannot communicate with the receiving station. In contrast, during the period when receiving station 22 is communicating with peripheral device 24, data messages received over PSTN 28 will not be lost. Microprocessor 44 and data pump 50 monitor the signals from PSTN 28 to ensure that they are immediately detected. Once such messages are detected, the microprocessor interrupts the connection between the receiving station and the peripheral device to ensure the message is received by the receiving station without delay.

Figure 4:
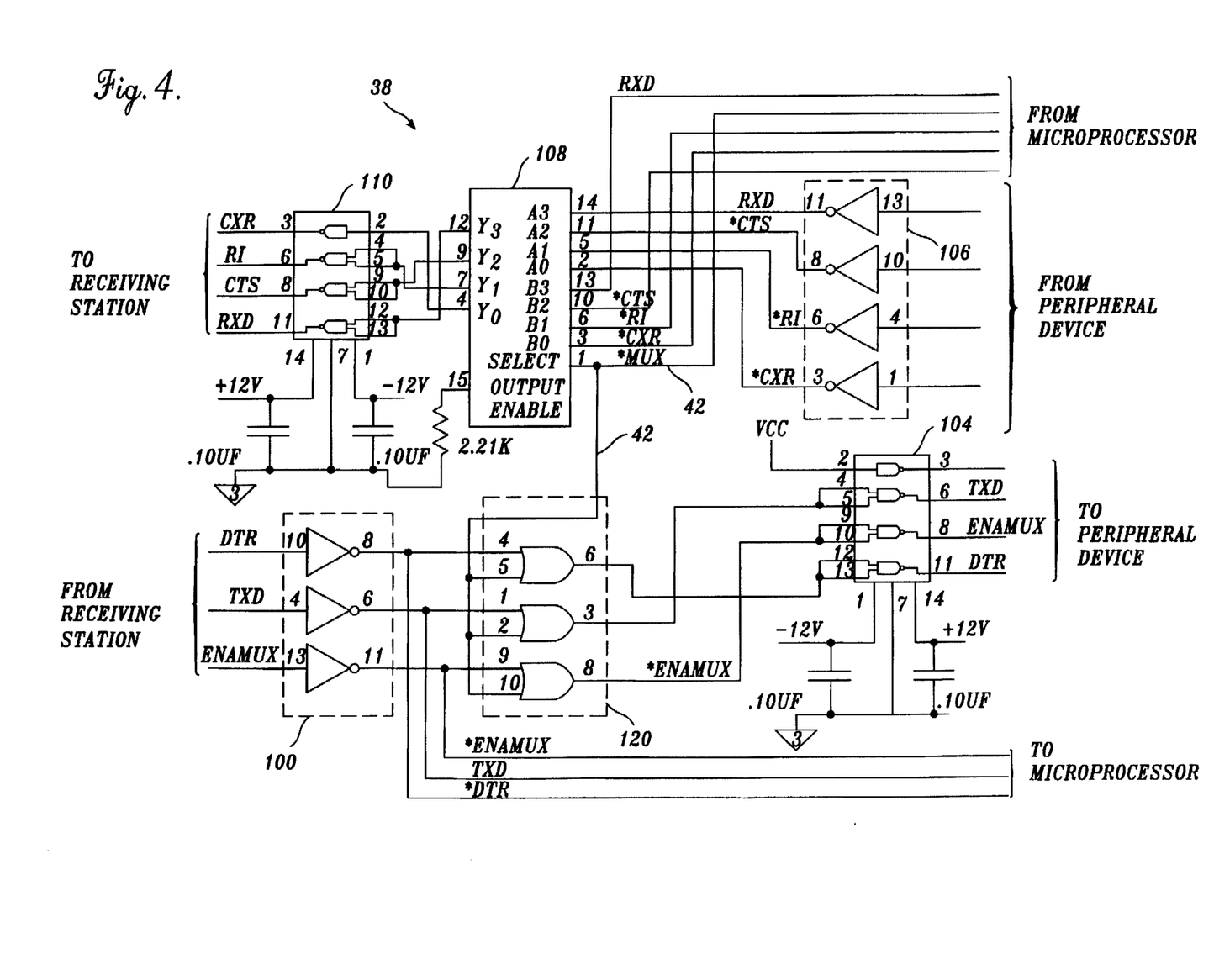
FIG. 4 is a schematic of the multiplexer and signal translator.

Additional details of multiplexer and signal translator 38 are provided in the electrical schematic of FIG. 4. The circuit shown in FIG. 4 is an actual embodiment of the functional block diagram shown in FIG. 3. Those skilled in the art will recognize that there are other ways of implementing the switching function.

The data communication between the receiving station, the peripheral device, and the PSTN is based on the RS-232-D standard and CCITT V.22 bis modem standards. The description of the signal lines manipulated by multiplexer and signal translator 38 will therefore correspond to the standard handshaking signals used in the data communications industry. For data reception from the microprocessor or from the peripheral device, the upper communications path in FIG. 4 is followed to the receiving station. Multiplexer 108 is connected to the microprocessor by four lines: (1) a clear to send (CTS) line, (2) a ring indicator (RI) line, (3) a signal carrier detected (CXR) line, and (4) a receive data (RXD) line. Similarly, four lines from the peripheral device carrying corresponding signals are also connected to multiplexer 108. Because the four lines from the peripheral device carry RS-232 level signals, the signals must first be converted to TTL levels before connection to multiplexer 108. A quad line receiver 106 is therefore placed in series with the four lines from the peripheral device to reduce the RS-232 levels to TTL-level voltages. Also connected to multiplexer 108 is line 42 carrying the *MUX signal from microprocessor 44. The *MUX signal selects which set of lines are to be connected to the receiving station. When the *MUX signal is low, the lines from the peripheral device are connected to the receiving station. When the *MUX signal is high, the microprocessor lines are connected by multiplexer 108 to the receiving station.

Pin 15 of multiplexer 108 is tied to ground, ensuring that the output lines of the multiplexer are always enabled. As a result, the data from the microprocessor lines or the data from the peripheral device lines will always be present on data lines $y_0$, $y_1$, $y_2$ and $y_3$. The data on these lines are fed into a quad line transmitter 110. The quad line transmitter converts the TTL-level signals to RS-232 -level signals for output to the receiving station. The upper data path of FIG. 4 therefore allows the receiving station to receive data and handshaking signals from either the microprocessor or the peripheral device based on the microprocessor controlled *MUX signal.

The lower data path of FIG. 4 provides the reverse communication link from the receiving station back to either the peripheral device or the microprocessor. Only three lines of data are necessary in this reverse direction: (1) a data terminal ready (DTR) line, (2) a transmitted data (TXD) line, and (3) a line indicating that the multiplexer should be enabled (ENAMUX). Because the three data lines from the receiving station are transmitted over an RS-232 cable, the signal levels on the lines must initially be converted to TTL-level logic. A quad line receiver 100 is therefore used to change the amplitude of the signals to between 0 and +5 volts. The output from the quad line receiver 100 is directly wired to inputs on the microprocessor. Because the microprocessor operates and controls the flow of the data in the priority line switching apparatus, it is not necessary to switch the lines that are leading to the microprocessor. Instead, the microprocessor can monitor the *ENAMUX signal to determine when the data on the signal lines are to be received by the microprocessor. When *ENAMUX is high, the data on the signal lines is to be received by the microprocessor. In contrast, the peripheral device typically cannot distinguish between data meant to be received by it or data to be received by the microprocessor. The three lines containing signal data are therefore input into a quad OR gate 120 which will pass or block the signals depending on the state of the *MUX signal. If the *MUX signal is high, the *ENAMUX line output from the quad or gate will remain at a high level, indicating that the peripheral device has not been selected, and there is no output from the quad OR gate. If the *MUX signal is low, the *ENAMUX line output from the quad OR gate may be driven low, indicating that data is to be transferred to the peripheral device. When the *MUX signal is low, the signals are passed by the quad OR gate into a quad line transmitter 104 which boosts the TTL-level signals to RS-232 signals for output to the peripheral device. Those skilled in the art will recognize that a multiplexer could have been used in place of quad OR gate 120 to perform this switching function. Implementation using the OR gates, however, is preferred in the actual embodiment of the apparatus.

Returning to FIG. 2, the second data transmission path connects public switched telephone network 28 with receiving station 22. An incoming priority data message sent over PSTN 28 is received by priority line switching apparatus 20 at port 32d. The priority message is provided to a PSTN interface 56 via a telephone line pair 52a (tip) and 52b (ring). PSTN interface 56 is used to detect a ring signal on PSTN 28 and to seize control of the telephone line based on a command issued by data pump 50.

Figure 5:
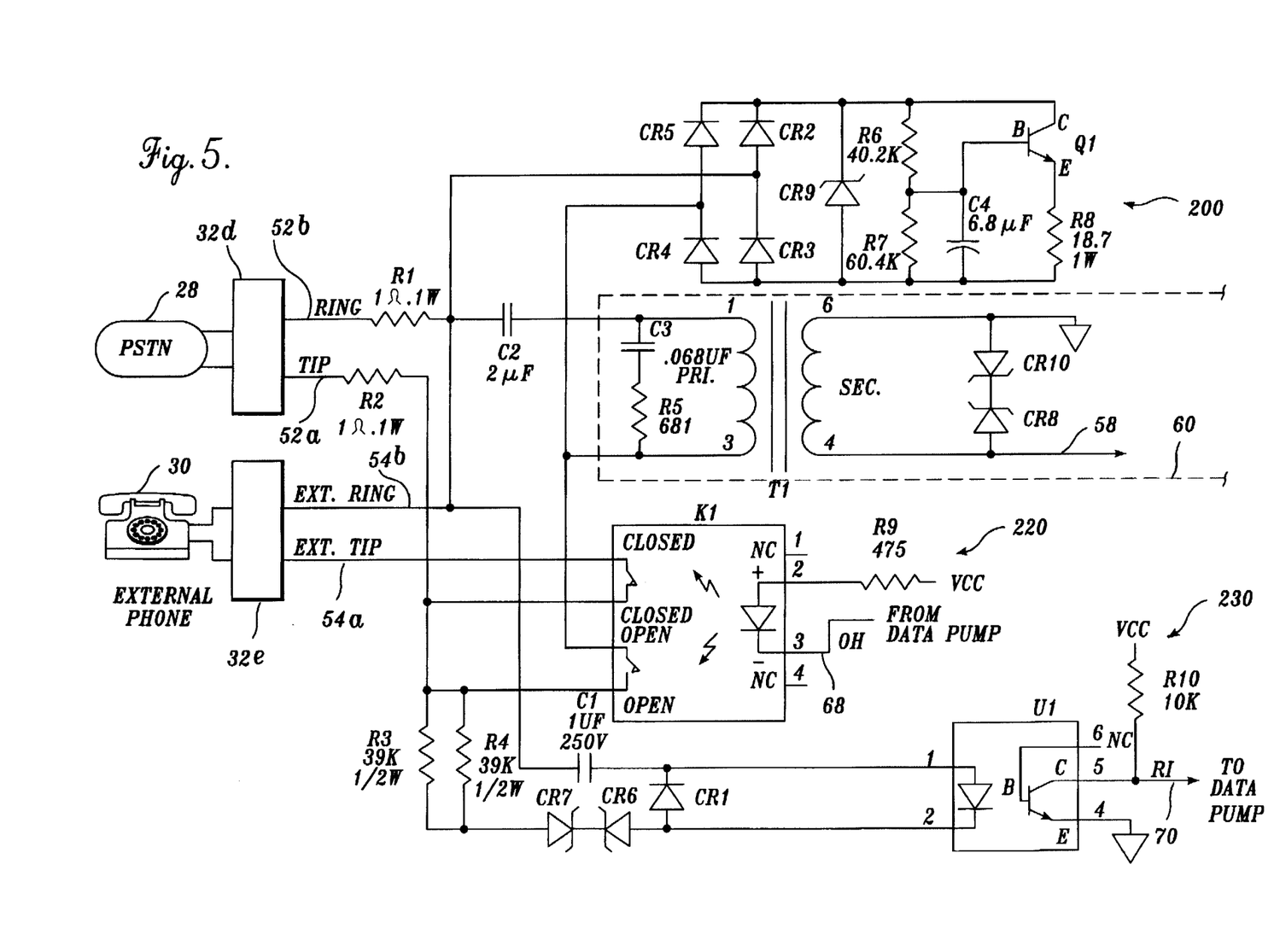
FIG. 5 is a schematic of a PSTN interface for interfacing the priority line switching apparatus with a PSTN and an external phone.

FIG. 5 is an electrical schematic of the PSTN interface 56 that is used to interface the data pump with public switch telephone network 28 using FCC and DOC compliant techniques. The majority of the components of the PSTN interface are known in the art, but the complete circuit is set forth with detail to show the particular implementation used in a preferred embodiment of the invention. As shown in FIG. 5, the PSTN interface actually consists of three discrete circuits: (1) a holding circuit 200, (2) a hook relay circuit 220, and (3) a ring detector circuit 230. Additionally, the PSTN is connected to the first stage of a hybrid circuit 60. Each of the three discrete circuits is discussed in more detail below.

Tip line 52a and ring line 52b are each connected to fusible resistors R1 and R2, respectively. The fusible resistors are designed to open circuit should a voltage spike be generated across the PSTN network lines. Ring detector circuit 230 is connected to the ring and tip lines after resistors R1 and R2, to determine when there is an incoming priority data message on PSTN 28 and to generate a ring indicator (RI) signal. Ring detector circuit 230 consists of an optical isolation amplifier U1 having two inputs connected to an internal light emitting diode, and two outputs connected to an internal light sensitive transistor. Current flow through the input diode causes the output transistor to conduct. In an actual embodiment of the circuit, optical isolation amplifier U1 is an SM 4N35, manufactured by Motorola, Inc. On the input side of isolation amplifier U1 is a network comprised of several resistors, diodes and a capacitor. Resistors R3 and R4 are connected in parallel between tip line 52a and a series connection of zener diodes CR7 and CR6. Zener diode CR6 is connected to one input of U1 and the anode of a diode CR1. The other input of U1 is connected to the cathode of diode CR1 and then to ring line 52b through a capacitor C1. The collector output of isolation amplifier U1 is connected via a resistor R10 to a voltage source VCC. The collector output is also connected to the data pump by a line 70 that carries the ring indicator (RI) signal. The emitter output of amplifier U1 is connected to ground.

When an incoming telephone call is received, a 150 VAC signal is generated across the ring and tip lines to drive the telephone ringer. Ring detector circuit 230 converts the 150 VAC to a CMOS level for transmission to the data pump. The filtered AC ring voltage applied across the input of U1 causes the output transistor of U1 to enter conduction. This drives the ring indicator signal on line 70 low, and signals the data pump that a priority data message is arriving. Additionally, the ring detector isolates the PSTN network from the data pump.

When the ring indicator signal indicates that a remote device is attempting to connect with the priority line switching apparatus, hook relay circuit 220 is used to seize control of the telephone line under the control of the data pump. Hook relay K1 is a solid state relay that contains a normally open switch and a normally closed switch. One side of the normally open switch is connected to the tip line, and the other side is connected to hybrid circuit 60, the first stage of which is shown in FIG. 5. The normally closed switch connects tip line 52a with an external tip line 54a. Controlling hook relay K1 is an off hook (*OH) signal, received from the data pump on a line 68. Pulling the *OH signal low opens the normally closed switch, breaking the connection between the tip line and the external tip line. Pulling the *OH signal low also closes the normally open switch and connects the tip line with the hybrid circuit 60.

When the *OH signal is applied to hook relay K1, ring line 52b and tip line 52a are connected across the primary coil of a transformer T1 in hybrid circuit 60. Ring line 52b is first filtered, however, by a capacitor C2. Capacitor C2 is sized to allow AC signals to pass to transformer T1 of the hybrid circuit while blocking any constant DC voltage. Also connected in parallel with the primary coil of transformer T1 is a capacitor C3 in series with resistor R5. The capacitor and resistor are sized to limit the noise that is applied to the primary transformer coil. The analog voltage signal seen across ring line and tip lines 52a and 52b is inductively coupled to appear on the secondary winding of transformer T1. The voltage output on the secondary winding is clamped by the series connection of zener diodes CR8 and CR10 applied in parallel with the secondary winding. The output voltage signal is generated on a data line 58 which connects to the remainder of hybrid circuit 60, described below. The purpose of transformer T1 is to isolate the PSTN network from the remainder of the priority line switching apparatus. As will be appreciated, the operation of transformer T1 is bidirectional. That is, a data signal received from the PSTN is transferred from ring line 52b and tip line 52a onto data line 58. Similarly, a data signal can pass through the priority line switching apparatus to be transmitted over the PSTN after application to the secondary winding of transformer T1.

While the transformer T1 effectively isolates the PSTN from the remainder of the priority line switching apparatus, it also affects the ability to seize the telephone line when the off-hook command is received on line 68. In order to initially seize the telephone line, a 48-volt DC signal present on the telephone line must be shunted.

Because of the construction of transformer T1, however, PSTN interface circuit 56 is incapable of shunting the initial line voltage. A holding circuit 200 is therefore provided to initially seize the telephone line when the off hook signal is received.

Holding circuit 200 consists of a network to rectify the line voltage and a bias voltage-controlled resistance circuit to shunt the DC line voltage. Ring line 52b is connected to parallel diodes CR2 and CR3. Tip line 52a is connected to parallel diodes CR4 and CR5. The outputs of each pair of diodes is connected across zener diode CR9. The diode bridge rectifies the telephone line voltage, and clamps it to a value limited by the value selected by zener diode CR9. The rectified line voltage is then applied across a voltage-controlled resistance circuit. The rectified line voltage is first divided by a voltage divider network comprised of resistor R6 in series with resistor R7. A capacitor C4 is connected at one side to the point between resistors R6 and R7 and at the other side to the base of a transistor Q1. The collector of transistor Q1 is connected to the rectified line voltage (between CR2 and CR5), and the emitter of transistor Q1 is connected to the other side of the rectified line voltage (between CR3 and CR4) through a resistor R8. When the DC line voltage is applied across holding circuit 200, the rectified DC line voltage causes transistor Q1 to enter into conduction, and to shunt the current between the ring and the tip lines.

This ensures that the telephone line will be seized for the remainder of the data message being received.

When the hook relay K1 is open and a priority data message is not being received, an external phone 30 may be used to communicate over PSTN 28. As shown in FIG. 4, external phone 30 is connected to the priority line switching apparatus via a port 32e. Two lines connect to external phone 30, an external ring line 54b and an external tip line 54a. When the off-hook signal is not asserted, the external ring line 54b is directly connected to the PSTN ring line 52b and the external tip line 54a is connected through hook relay K1 to the PSTN tip line 52a. When a priority message is not being received, the external phone can therefore be used to dial out on the PSTN network. When data pump 50 asserts the off-hook signal to hook relay circuit 220, however, the normally-closed switch maintaining the tip connection is opened. This disconnects external phone 30 from PSTN 28, and renders the external phone nonfunctional for the length of time that the off-hook signal is asserted.

As shown in FIG. 2, the priority data message received by PSTN interface 56 is provided to the second stage hybrid circuit 60 over data line 58. In general, the second stage of the hybrid circuit combines the transmit and receive lines from the data pump for application to PSTN interface 56. Data transmitted from the data pump are received by the hybrid circuit over a transmitted data line 64. In an actual embodiment of the invention, the data received on line 64 is provided at 2400 bits per second. Transmitted data received on line 64 is buffered and amplified by the hybrid circuit before it is output on line 58. In the reverse communication direction, data received from the PSTN interface on data line 58 is also buffered and amplified before being provided to the data pump on line 66. The received data is also filtered and outputted on a line 62 to audio amplifier stage 64. The use of a hybrid circuit to route transmitted and received signals is well known in the art.

Hybrid circuit 60 is connected to data pump 50 by lines 64 and 66. Data pump 50 is a modem that is used to convert analog data received from the PSTN into a digital signal that may be transmitted to microprocessor 44 over address/data bus 46, and vice versa. In an actual embodiment of the apparatus, data pump 50 is an SM-RC23240P/1, manufactured by Rockwell International. The data pump is a modem capable of transmitting at 2400 bps using a CCITT V.22 bis protocol.

Line 64 carries data messages that are to be transmitted over the PSTN at 2400 bits per second. Line 66 carries data messages that are received over the PSTN from remote devices at 2400 baud. Those skilled in the art will recognize that the data pump is operating in a standard configuration that allows data to be received and transmitted over the public switched telephone network. Data pump 50 is also used to control PSTN interface 56. When an incoming data transmission message is received, data pump 50 receives a ring indicator (RI) signal on line 70. Additionally, when the telephone line is to be seized, data pump 50 asserts an off-hook (*OH) signal on line 68. Each of these signals is used to control the connection of PSTN interface 56 with public switched telephone network 28.

Data pump 50 is connected to microprocessor 44 by address/data bus 46.

When a priority data message has been serially received in analog form over the public switched telephone network, the data pump communicates the data message in parallel digital form to microprocessor 44. Microprocessor 44 is in turn connected to multiplexer and signal translator 38 by a serial data bus 40. The parallel data received from the data pump is therefore converted by the microprocessor to serial data for transmission to the multiplexer 38. By asserting the appropriate *MUX signal on line 42, the priority data message may then be output to receiving station 22 over serial data bus 34.

In summary, the second data transmission path allows a priority data message received over public switched telephone network 28 to be routed through data pump 50, through microprocessor 44, and finally through multiplexer and signal translator 38 to receiving station 22. When a priority data message is being received over the second data transmission path, receiving station 22 is disconnected from peripheral device 24. The type of microprocessor and data pump determines the speed and capability of system transmission. In an actual embodiment of the apparatus, data communication is limited to 2400 bits per second. However, the data pump and the microprocessor, if necessary, can be upgraded to provide more rapid transmission.

Figure 6:
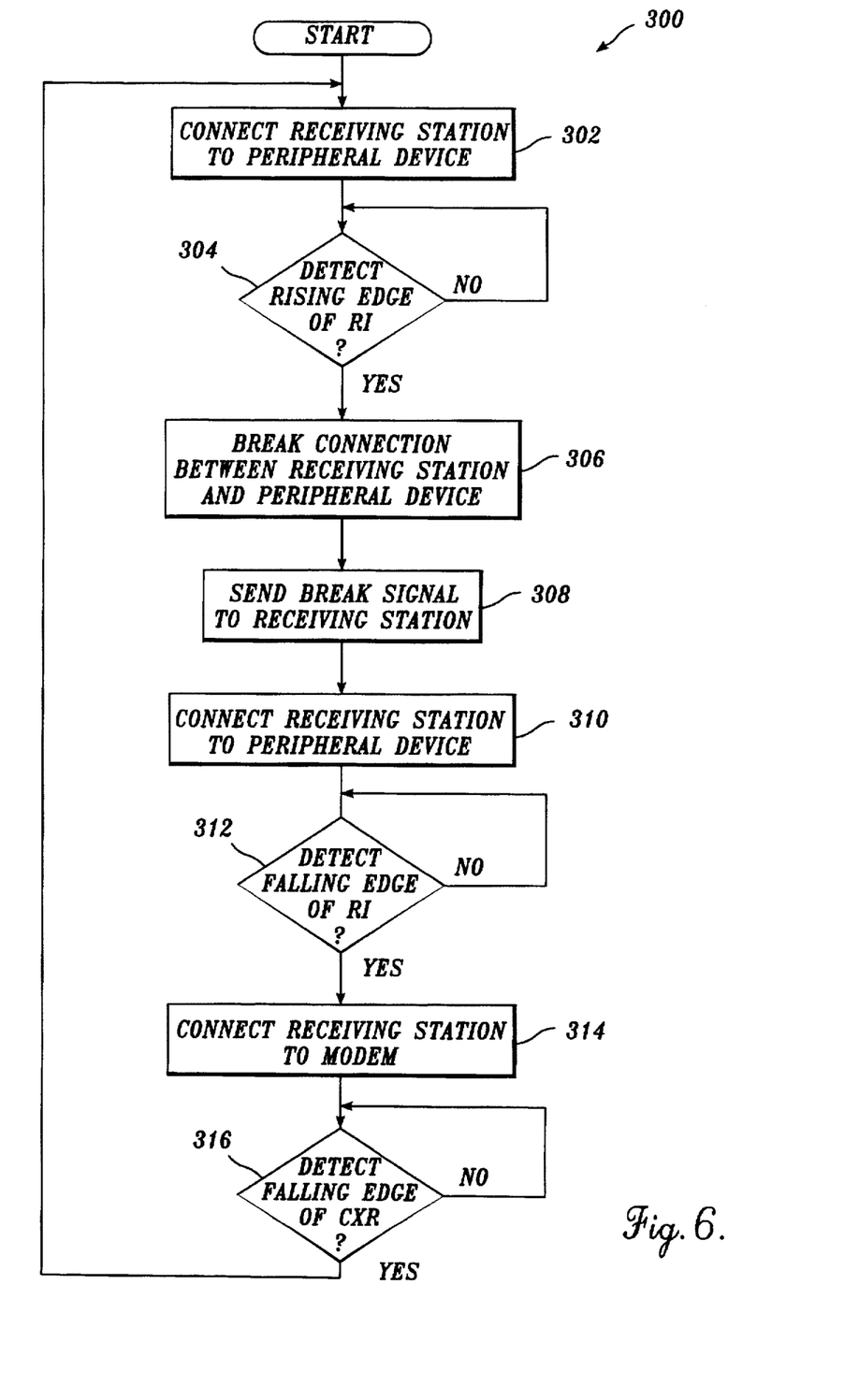
FIG. 6 is a flow chart of a program used to control the operation of the priority line switching apparatus.

The operation of priority line switching apparatus 20 will become clearer with reference to the flow chart of the apparatus control program provided in FIG. 6. In order to control the operation of priority line multiplexer apparatus 20, a control program is implemented in microprocessor 44. The operation of the control program is discussed with reference to the hardware diagrams provided in FIG. 3 and FIG. 4.

When the power is initially turned on in the priority line switching apparatus, the apparatus connects the receiving station to the peripheral device as represented by block 302 of FIG. 6. This allows receiving station 22 to communicate with peripheral device 24 over ports 32a and b. After connecting the receiving station to the peripheral device, the priority line switching apparatus 20 monitors port 32d for an incoming priority data message. That is, at a decision block 304, the program waits to detect a rising edge of the ring indicator (RI) signal. The ring indicator signal is generated by PSTN interface 56, and provided to data pump 50 over line 70. If the ring indicator signal is not detected, the "no" branch is taken and the program continues to monitor the incoming telephone line. If, however, the rising edge of the ring indicator signal is detected, the "yes" branch of decision block 304 is taken, and the program continues to a block 306.

At block 306, microprocessor 44 asserts a *MUX signal on line 42 to break the connection between the receiving station and the peripheral device. This is performed by setting the *MUX signal high on line 42, thereby changing the states of the multiplexers 102 and 108. At a block 308, the microprocessor then sends a "break" signal to the receiving station. The "break" signal indicates to the receiving station that an incoming priority data message is to be received, and that the receiving station should temporarily terminate data transmission with the peripheral device. In an actual embodiment of the invention, two different break signals are provided to the receiving station. One break signal is transmitted over the receive data (RXD) line. The RXD break signal is defined by the length of the character being transmitted. Specifically, the break signal is defined as a low logic condition of 2M+3 bits in duration followed by a high logic condition of at least 2M bits in duration (where M=the number of bits per character). If a character is 10 bits, the break transmitted over the RXD line is therefore defined as 23 bits of logic zero followed by 20 bits of logic one. A second break signal is provided on the ring indicator (RI) line. The microprocessor drives the RI line high, indicating that a telephone connection is attempting to be made. A receiving station may therefore halt its data communication with the peripheral device when it receives either the RXD or the RI break signal. In an actual embodiment of the system, the receiving station terminates its data transfer based on the RI break signal.

After sending the "break" signal to the receiving station, at a block 310 the microprocessor reconnects the receiving station with the peripheral device. The connection is remade by asserting a low *MUX signal on line 42. This allows the receiving station to terminate the data transmission with the peripheral device.

Terminating the data transfer may involve storing the point at which the current operation is halted or identifying a prior point in the transmission (for example, at the beginning of a data message) where it would be most efficient to continue data transfer when the receiving station is reconnected with the peripheral. As the receiving station is terminating its transmission with the peripheral device, the priority line switching apparatus continues to monitor the telephone line connection with the PSTN network. At a decision block 312, the program enters a loop waiting to detect the falling edge of the ring indicator signal.

When the falling edge of the ring indicator signal is detected, the program continues to a block 314. At block 314, the microprocessor 44 generates a signal to disconnect the receiving station from the peripheral device and to connect the receiving station to the data pump. This allows receiving station 22 to transmit and receive data over public switched telephone network 28. It therefore takes the length of one ring indicator (RI) signal (typically about two seconds) for the priority line switching apparatus to disconnect, reconnect, and disconnect the receiving station from the peripheral device, and then to connect the receiving station to the external telephone network for data reception. Between the detection of the leading and falling edge of the ring indicator signal, the receiving station is provided sufficient time to terminate the data transfer with the peripheral device and prepare itself to receive the priority data message. In an actual embodiment of the switching apparatus, the microprocessor ensures that at least two seconds are provided to allow the receiving station sufficient time to terminate its current data transmission.

After the receiving station is connected to the modem at block 314, the priority data message may be received. As the data message is being received, microprocessor 44 monitors to detect the falling edge of CXR at a block 316. This monitoring is possible because the data message must pass through the microprocessor before output to the receiving station over the multiplexer and signal translator. When the falling edge of CXR is detected, the program loops back up to block 302. The CXR signal is only received when the data message is complete, or when there has been an error that results in the termination of the data transmission. After the message has been received, microprocessor 44 disconnects the receiving station from the modem and reconnects the receiving station to the peripheral device to allow the receiving station to complete any prior data transmission that it was performing with the peripheral device. See block 302.

From the above description, it will be appreciated that priority line switching apparatus 20 allows the receiving station to transmit and receive data over a single serial port with several different peripheral devices. The switching apparatus 20 therefore eliminates the need of manually connecting and disconnecting cables when different devices are to be used. Additionally, the present invention also ensures that incoming priority data messages are not lost or delayed while receiving station 22 is communicating with a peripheral device. Switching apparatus 20 closely monitors the connection with PSTN 28 to detect incoming priority data messages and to break into the communication between the receiving station and the peripheral device in order to notify the receiving station that the priority data message is to be received.

The above description describes the general hardware and software necessary for practicing the disclosed invention. Additional blocks are shown in the block diagram of FIG. 2 that are present in the apparatus, but are not directly involved with the switching of data ports. A voltage monitor and supply 74 is connected to microprocessor 44 and also to port 32c. The voltage monitor and supply 74 receives power from external power supply 26, and generates the appropriate voltages to run the circuitry contained in the priority line switching apparatus. Microprocessor 44 is connected to the voltage monitor and supply in order to regulate and ensure that the appropriate voltages are being generated for system operation. Connections between the voltage monitor and supply 74 and the other system components in FIG. 2 are omitted for purposes of clarity.

An audio output stage 64 is also provided in the priority line switching apparatus. The audio output stage is connected to the hybrid circuit to provide audio feedback to a user about the status of the modem. That is, audio output is provided to indicate when the telephone is ringing, when the telephone is receiving a busy signal, or when a connection has finally been made. Microprocessor 44 is connected to the audio output stage 64 via a line 76, and can assert a signal over line 76 that mutes the audio during data transmission and reception.

For added convenience, the priority line switching apparatus also contains an additional port 32e that allows an external phone 30 to be connected to the system. The signal from external phone is connected to PSTN interface 56 over telephone line pair 54a and 54b. As was previously discussed with respect to the PSTN interface, external phone 30 may be used to connect with PSTN 28 when priority messages are not being received. When such calls are being made, the priority switching apparatus cannot receive incoming priority data messages. The external phone is therefore generally not used in normal system operation.

Finally, data received on data buses 34 and 36, as well as telephone line pair 52a and 52b, may occasionally be subject to voltage fluctuations. Such swings may occur due to external shorts, or may be caused by natural interference such as lightning. Priority line switching apparatus 20 therefore contains a static protection circuit 72 that clamps the voltage on the data lines to a maximum value to ensure that circuitry internal to the priority line switching apparatus will not be damaged by spurious voltage signals.

While the preferred embodiment of the invention has been illustrated and described, it will be appreciated that various changes can be made therein without departing from the spirit and scope of the invention. For example, although the disclosed apparatus allows a receiving station to connect with a single peripheral port and a single telephone line, it will be appreciated that the apparatus could be configured to allow multiple port connections. A priority switching system having several data ports would allow a receiving station to be connected to multiple peripheral devices. Additionally, with the appropriate control software, multiple telephone line connections could be monitored to allow priority data messages from more than one location to be downloaded to receiving station 22. This would increase the flexibility of the apparatus, and allow the receiving station to download or route priority data messages to more than a single device.

It will further be appreciated that although the implementation described herein is used for a North American telephone system, changes could be made to the circuitry to allow the priority line switching apparatus to be used in Europe, or other foreign countries. Because the voltage levels and ring patterns are slightly different in foreign countries, PSTN interface circuit 56 could be modified to ensure that the system operated regardless of the country in which it is used.

Similarly, those skilled in the art will also recognize that different standards may be used to transmit data between the receiving station and the peripheral devices. In the preferred embodiment of the invention, an RS-232 standard is used to transmit data between the receiving station and the peripheral device. The actual format and type of data being transferred may, however, depend on the particular devices connected to the priority line switching apparatus. If necessary, the quad line receivers and transmitters contained in the multiplexer and signal translator 38 may therefore be varied to provide the appropriate signal level conversion.

As was briefly discussed earlier, it will also be appreciated that the method for data communication over the PSTN could be varied by changing the type of data pump 50 that is used in the system. In an actual embodiment of the apparatus, the data pump allows for communication over the PSTN at a rate of 2400 bits per second. This rate may be adjusted upward or downward by the substitution of an appropriate data pump or the addition of a second data pump. Additionally, recently installed networks have allowed for the digital, rather than analog, transmission of telephone conversations. In a digital environment, the priority switching apparatus may be configured to transmit data over the telephone network digitally rather than using analog techniques. This would eliminate the use of a modem in the switching apparatus.

Finally, it will also be appreciated that the apparatus may be modified to handle the switching of both parallel and serial data. In the preferred embodiment of the apparatus, the receiving station communicates with the peripheral device using serial communication. It would be a simple matter of expanding multiplexer and signal translator 38 to allow the receiving station to communicate with the peripheral device over a parallel data interface. In such a case, multiplexer and signal translator 38 would have to switch multiple data lines rather than the single data line currently used for serial data transfer. It is an object of the appended claims to cover all modifications and variations as come within the true spirit and scope of the invention.

The embodiments of the invention in which an exclusive property or privilege is claimed are defined as follows:

1. A priority line switching apparatus for connection between a first device for transmitting and receiving data messages, and two or more peripheral devices, including a first peripheral device for communicating data messages with the first device and a second peripheral device for communicating data messages with the first device, the second peripheral device supplying an indicator signal when a data message is to be transmitted to the first device, the apparatus comprising:

a switch having a first connection for coupling to the first device, a second connection for coupling to the first peripheral device, and a third connection for coupling to the second peripheral device, said switch being operable in a first mode of operation to connect the first connection with the second connection and in a second mode of operation to connect the first connection with the third connection, for conveying data messages therebetween; and control means normally maintaining the switch in the first mode of operation to allow transmission of a data message between the first device and the first peripheral device, said control means including means for monitoring the third connection for receipt of an indicator signal from the second peripheral device during transmission of the data message, and for automatically supplying a first control signal to the switch to interrupt the transmission of the data message with the first peripheral device and change from the first mode of operation to the second mode of operation upon receipt of the indicator signal.

2. The apparatus of claim 1, wherein the control means includes means for detecting the indicator signal and for supplying the first control signal to the switch upon such detection.

3. The apparatus of claim 2, wherein the control means includes means for generating a break signal and transmitting the break signal to the first device to indicate to the first device that a data message is to be received from the second peripheral device.

4. The apparatus of claim 3, wherein the control means includes means for generating a second control signal to the switch within a predetermined period after supplying the first control signal to change the switch back to the first mode of operation and allow the first device to terminate transmission of data messages with the first peripheral device.

5. The apparatus of claim 4, wherein the control means includes means for generating a third control signal to the switch within a predetermined period after supplying the second control signal to change the switch to the second mode of operation and allow the first device to receive the data message from the second peripheral device.

6. The apparatus of claim 5, wherein the control means includes means for generating a fourth control signal to change the switch to the first mode of operation after the data message has been received from the second peripheral device.

7. The apparatus of claim 1, wherein the second peripheral device is a portable physiological instrument.

8. A priority line switching apparatus for selectively connecting a first device to a peripheral device and a public switched telephone network to allow the first device to transmit data messages to the peripheral device and receive data messages from a remote device over the public switched telephone network, the public switched telephone network supplying an indicator signal when a data message is to be received, the apparatus comprising:

a switch having a first connection for coupling to the first device, a second connection for coupling to the peripheral device, and a third connection for coupling to the public switched telephone network, the switch being operable in a first mode of operation to connect the first connection with the second connection and in a second mode of operation to connect the first connect and the third connection, for conveying data messages therebetween; and control means normally maintaining the switch in the first mode of operation to allow transmission of data messages from the device to the peripheral device, said control means including means for monitoring the third connection for receipt of an indicator signal from the public switched telephone network during transmission of data messages between the first device and the peripheral device and for automatically supplying a first control signal to the switch to interrupt the transmission of data messages and change from the first mode of operation to the second mode of operation upon receipt of the indicator signal.

9. The apparatus of claim 8, further comprising a modem coupled between the third connection and the control means for modulating and demodulating data messages conveyed between the first device and the public switched telephone network.

10. The apparatus of claim 9, further comprising an interface circuit coupled between the modem and the third connection for generating a ring indicator (RI) signal indicative of a data message transmitted over the public switched telephone network and for providing the RI signal to the modem and the control means.

11. The apparatus of claim 10, wherein the control means includes means for detecting the RI signal and for supplying the first control signal to the switch upon such detection.

12. The apparatus of claim 11, wherein the control means includes means for generating a break signal and transmitting the break signal to the first device to indicate to the first device that a data message is to be received from the public switched telephone network.

13. The apparatus of claim 12, wherein the control means includes means for generating a second control signal to the switch within a predetermined period after supplying the first control signal to change the switch back to the first mode of operation to allow the first device to terminate transmission of data messages with the peripheral device.

14. The apparatus of claim 13, wherein the control means includes means for generating a third control signal to the switch within a predetermined period after supplying the second control signal to change the switch to the second mode of operation to allow the first device to receive the data message from the public switched telephone network.

15. The apparatus of claim 14, wherein the control means includes means for generating a fourth control signal to change the switch to the first mode of operation after a data message has been received from the public switched telephone network.

16. The apparatus of claim 15, wherein the control means supplies the first control signal at the onset of a ring indicator (RI) signal, the second control signal during such RI signal and the third control signal at the conclusion of such RI signal.

17. The apparatus of claim 8, wherein the data messages are transmitted serially.

18. The apparatus of claim 8, wherein the data messages are transmitted in parallel.

19. The apparatus of claim 8, wherein the switch includes a multiplexer.

20. The apparatus of claim 8, wherein the remote device is a portable physiological instrument.

21. A method of selectively switching a connection between a data port on a terminal device, a first port coupled to a peripheral device, and a second port coupled to a remote device by a telephone line to allow reception of a priority data message over the telephone line by the terminal device, the priority data message preceded by a ring signal, the method comprising the steps of:

(a) connecting the data port on the terminal device to the first port on the peripheral device to allow data transmission between the terminal device and the peripheral device;

(b) monitoring the second port that is coupled to the remote device by a telephone line to detect a ring signal during data transmission between the terminal device and the peripheral device;

(c) breaking the connection between the data port and the first port upon detection of the ring signal;

(d) transmitting a break signal to the terminal device to signal the terminal device to terminate data transmission with the peripheral device;

(e) reconnecting the data port and the first port to allow the terminal device to terminate the data transmission with the peripheral device;

(f) breaking the connection between the data port and the first port after the terminal device has terminated the data transmission with the peripheral device; and (g) connecting the data port with the second port to allow the terminal device to receive a priority data message over the telephone line.

22. The method of claim 21, further comprising the steps of:

(a) breaking the connection between the data port and the second port after the priority data message is received; and (b) reconnecting the data port with the first port to allow the terminal device to complete the data transmission with the peripheral device.

23. The method of claim 21, wherein step (c) is performed on a rising edge of the ring signal.

24. The method of claim 23, wherein step (f) is performed on a falling edge of the ring signal.

* * * * *

UNITED STATES PATENT AND TRADEMARK OFFICE
CERTIFICATE OF CORRECTION

PATENT NO. : 5,787,155
DATED : July 28, 1998
INVENTOR(S) : M.E.S. Luna

It is certified that error appears in the above-identified patent and that said Letters Patent is hereby corrected as shown below:

COLUMN  LINE

| | | |
|---|---|---|
| 14 | 61 | after "from the" insert --first-- |
| (Claim 8, | line 20) | |
| Title Page: [56] Pg. 1, col. 1 | Refs. Cited (U.S. Patents) | Please insert the following references:<br>--3,819,862 06/1974 Hedges<br>4,059,727 11/1977 Kingswell et al.<br>4,076,961 02/1978 Holsinger et al.<br>4,847,892 07/1989 Shelley<br>4,958,371 09/1990 Damoci et al.<br>5,146,489 09/1992 Telibasa<br>5,151,972 09/1992 Lorenz et al.<br>5,185,784 02/1993 Nashimoto<br>5,193,089 03/1993 Tsuchida<br>5,214,690 05/1993 Kato et al.<br>5,321,618 06/1994 Gessman-- |

Signed and Sealed this

Sixteenth Day of February, 1999

Attest:

Attesting Officer

Acting Commissioner of Patents and Trademarks

UNITED STATES PATENT AND TRADEMARK OFFICE
CERTIFICATE OF CORRECTION

PATENT NO.   : 5,787,155
DATED        : July 28, 1998
INVENTOR(S)  : M.E.S. Luna It is certified that error appears in the above-indentified patent and that said Letters Patent is hereby corrected as shown below:

| COLUMN | LINE | |
|---|---|---|
| 14 | 56 | "connect" should read --connection-- |
| (Claim 8, | line 15) | |

Signed and Sealed this

Fifteenth Day of June, 1999

Attest:

Attesting Officer

Q. TODD DICKINSON

Acting Commissioner of Patents and Trademarks